US005572668A

United States Patent [19]

See et al.

[11] Patent Number: 5,572,668

[45] Date of Patent: Nov. 5, 1996

[54] METHOD AND APPARATUS FOR UNIVERSAL NATIONAL LANGUAGE SUPPORT PROGRAM TESTING

[75] Inventors: Hiow-Tong J. See, Newark; Makoto Hoketsu, San Mateo, both of Calif.

[73] Assignee: Oracle Corporation, Redwood Shores, Calif.

[21] Appl. No.: 385,192

[22] Filed: Feb. 7, 1995

[51] Int. Cl.[6] .................... G06F 11/00

[52] U.S. Cl. .................... 395/183.14; 395/183.08

[58] Field of Search .................... 395/183.14, 183.13, 395/183.15, 183.11, 500, 700, 183.08, 183.09

[56] References Cited

U.S. PATENT DOCUMENTS

| | | | |
|---|---|---|---|
| 4,615,002 | 9/1986 | Innes | 364/200 |
| 4,729,096 | 3/1988 | Larson | 364/300 |
| 5,231,581 | 7/1993 | Garneau et al. | 364/419 |
| 5,265,254 | 11/1993 | Blasciak et al. | 395/700 |
| 5,337,233 | 8/1994 | Hofert et al. | 364/419.14 |
| 5,339,419 | 8/1994 | Chan et al. | 395/700 |
| 5,390,314 | 2/1995 | Swanson | 395/500 |
| 5,410,681 | 4/1995 | Jessen et al. | 395/500 |
| 5,428,772 | 6/1995 | Merz | 395/600 |
| 5,432,935 | 7/1995 | Kato et al. | 395/700 |

OTHER PUBLICATIONS

Oracle RDBMS Database Administrator's Guide Version 6.0, 1987, 90, F-1 to F-11.

*Primary Examiner*—Robert W. Beausoliel, Jr.
*Assistant Examiner*—Joseph E. Palys
*Attorney, Agent, or Firm*—Irell & Manella LLP

[57] ABSTRACT

A Universal NLS ("UNLS") paradigm is disclosed to test the integration of localized multi-national software application programs. A user prepares a UNLS test script using a plurality of UNLS operators. The UNLS operators identify non-ASCII and multibyte characters, as well as provide other functions. The UNLS test script created by the user is provided to a UNLS translator which translates the UNLS test script into any one of a number of desired target languages for a selected target computer platform. The UNLS translator translates the UNLS script by translating ASCII character strings in accordance with the UNLS operators. Each ASCII character in an identified string is translated to a predefined "problem" character in the target language. A maximal coverage lookup table maps ASCII characters to problem characters. A "problem" character is defined as a character in the target language which has historically presented a greater likelihood of error when used by a localized computer program. By using problem characters, the localized computer program is tested in an efficient and cost effective manner.

21 Claims, 9 Drawing Sheets

MASS MEMORY
I/O CIRCUIT
CPU
MEMORY
20
22
24
26
30
32
34
36

FIG. 2

| LANGUAGE | CHARACTER EXAMPLE | MAX # BYTES REQ'D/CHARACTOR |
|---|---|---|
| ENGLISH | B | 1 |
| THAI | ฮ | 1 |
| CHINESE | 德 | 4 |
| JAPANESE | お | 2 |

FIG. 5

MAXIMAL COVERAGE AUTOMATED TRANSLATION

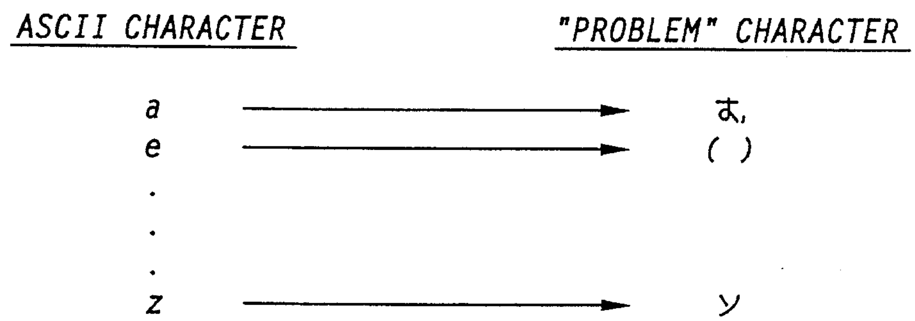

FIG. 6

M → 1:1 MAP TO REAL TARGET CHARACTER
K → ASCII ENCODING
L → ENGLISH DATE TO TARGET LANGUAGE FORMAT
S → SEMANTIC OPERATOR : TABLE LOOK UP
C → DOUBLES BYTES TO ACCOMMODATE UNLS TEST BUILDER
F → AS A FIXED MULTIPLE BYTE OPERATOR (M)
I → AS A FIXED ASCII KEYSTROKE/FIXED BYTE OPERATER ^ (K)
O → ORACLE MAXIMUM TABLE STRING LENGTH

FIG. 7

SEMANTIC OPERATOR TABLE LOOK-UP

^ S: JEFFREY ^ → เจ๊ฟฟรีย์
^ S: BLATT ^ → แบลท
^ S: HELLO ^ → สวัสดี

UNLS SCRIPT
40
UNLS TRANSLATOR
42
NLS SCRIPT 44
ENGLISH SCRIPT
JAPANESE SCRIPT
CHINESE SCRIPT
THAI SCRIPT
MULTIBYTE FOREIGN SCRIPT
UNLS INTERPRETER 46
SCRIPT INTERPRETER 48
NLS RESULTS 50
ENGLISH RESULTS
JAPANESE RESULTS
CHINESE RESULTS
THAI RESULTS
FOREIGN RESULTS

FIG. 4

```
UNLS Script
************


use   '^S:mainwins.inc^';
use   'unls.inc';

main   ()
(
   OracleGraphicsDesigner.SetActive  ();
   OracleGraphicsDesigner.Move  (520, 10);
   OracleGraphicsDesigner.File.New.Pick  ();
   OracleGraphicsDisplLayout.ToolPalette.Click (1, 8, 127);
   OracleGraphicsDisplLayout.Canvas.PressMouse (1, 26, 37);
   OracleGraphicsDisplLayout.Canvas.ReleaseMouse (1, 174, 178);
   ChartGenie.Uite_textedit1.Click (1, 136, 12);
   ChartGenie.Uite_textedit1.TypeKeys ("select * from ^K:emp^
                                        where ^K:hiredate^ =
                                        '^L:03-DEC-81^'");
   ChartGenie.OK.Click (1, 39, 4);
   MessageBox.Connect.Click  ();
   Connect.Uifi_field1.Click (1, 23, 12);
   Connect.Uifi_field1.TypeKeys
                ("^S:scott/tiger@t:139.185.31.237:sjis^");
   Connect.Connect.Click (1, 49, 11);
   ChartProperties.TabButton.Click (1, 234, 20);
   ChartProperties.TabPage.Uitl_textlist1.Click (1, 52, 20);
   ChartProperties.TabPage.Insert.Click (1, 11, 6);
   ChartProperties.TabPage.Uitl_textlist2.Click (1, 12, 1);
   ChartProperties.TabPage.Delete.Click (1, 41, 5);
   ChartProperties.TabButton.Click (1, 308, 18);
   ChartProperties.TabPage.Uitl_textlist2.Click (1, 21, 4);
   ChartProperties.TabPage.Delete.Click (1, 44, 3);
   ChartProperties.TabPage.Uitl_textlist2.Click (1, 10, 29);
   ChartProperties.TabPage.Delete.Click (1, 41, 7);
   ChartProperties.OK.Click (1, 35, 3);
   OracleGraphicsDesigner.Edit.SelectAll.Pick();
   OracleGraphicsDesigner.Format.Font.Pick ();
   Font.FontStyle.Select("^S:Bold Italic^");
   Font.OK.Click(1, 35,3);
   OracleGraphicsDesigner.File.SaveAs.FileSystem.Pick ();
   SaveAs.FileName1.SetText ("^K:t1^");
   SaveAs.OK.Click ();
 )
```

60

55

Japanese Script
***************

FIG. 8

```
use   'mainwinj.inc';
use   'unls.inc';

main   ()
(
   OracleGraphicsDesigner.SetActive  ();
   OracleGraphicsDesigner.Move  (520, 10);
   OracleGraphicsDesigner.File.New.Pick  ();
   OracleGraphicsDisplLayout.ToolPalette.Click (1, 8, 127);
   OracleGraphicsDisplLayout.Canvas.PressMouse (1, 26, 37);
   OracleGraphicsDisplLayout.Canvas.ReleaseMouse (1, 174, 178);
   ChartGenie.Uite_textedit1.Click (1, 136, 12);
65 ChartGenie.Uite_textedit1.TypeKeys ("select * from
                                         ~Zso~~Ita~~Hma~where
                                         ~Zso~~Hso~~Zta~~Zso~~
                                         Hha~~Zso~~Zzo~~Zso~ =
                                         '81-12-03'");
   ChartGenie.OK.Click (1, 39, 4);
   MessageBox.Connect.Click  ();
   Connect.Uifi_field1.Click (1, 23, 12);
   Connect.Uifi_field1.TypeKeys
                  ("scott/tiger@t:139.185.31.237:sjis");
   Connect.Connect.Click (1, 49, 11);
   ChartProperties.TabButton.Click (1, 234, 20);
   ChartProperties.TabPage.Uitl_textlist1.Click (1, 52, 20);
   ChartProperties.TabPage.Insert.Click (1, 11, 6);
   ChartProperties.TabPage.Uitl_textlist2.Click (1, 12, 1);
   ChartProperties.TabPage.Delete.Click (1, 41, 5);
   ChartProperties.TabButton.Click (1, 308, 18);
   ChartProperties.TabPage.Uitl_textlist2.Click (1, 21, 4);
   ChartProperties.TabPage.Delete.Click (1, 44, 3);
   ChartProperties.TabPage.Uitl_textlist2.Click (1, 10, 29);
   ChartProperties.TabPage.Delete.Click (1, 41, 7);
   ChartProperties.OK.Click (1, 35, 3);
   OracleGraphicsDesigner.Edit.SelectAll.Pick();
   OracleGraphicsDesigner.Format.Font.Pick ();
   Font.FontStyle.Select("ﾎﾞｰﾙﾄﾞ ｲﾀﾘｯｸ ");
58 Font.OK.Click(1, 35,3);
   OracleGraphicsDesigner.File.SaveAs.FileSystem.Pick ();
   SaveAs.FileName1.SetText ("~Zzo~1");
   SaveAs.OK.Click ();
```

FIG. 11(a)

```
{"a", "{NLS('so', ZK)}","ソ" },
{"e", "{NLS('so', ZK)}","ソ"},
{"i", "{NLS('so', HK)}","ｿ"},
{"o", "{NLS('po', ZK)}","ポ" },
{"u", "{NLS('ma', ZK)}","マ" },
{"s", "{NLS('ze', ZK)}","ゼ" },
```

```
LIST OF NLS_MAPC JA16SJIS_COVERAGE_MAP=
{
  {"a", "{NLS('so', ZK)}","ソ ", 2},
  {"e", "{NLS('ya', HK)}","ﾔ ", 1},
  {"i", "{NLS('A', ME)}","A", 2},
  {"o", "{NLS('yo', HK)}","ﾖ", 1},
  {"u", "{NLS('di', ZK)}","ヂ ", 2},
  {"s", "{NLS('da', ZK)}","ダ ", 2},
  {"t", "{NLS('po', ZK)}","ポ ", 2},
  {"h", "{NLS('ma', ZK)}","マ ", 2},
  {"c", "{NLS('mi', ZK)}","ミ ", 2},
  {"r", "{NLS('a', ZK)}","ア ", 2},
  {"n", "{NLS('me', ZK)}","メ ", 2},
  {"l", "{NLS('xu', ZH)}","ぅ", 2},
  {"m", "{NLS('u', ZK)}","ウ ", 2},
  {"k", "{NLS('ta', ZK)}","タ", 2},
  {"d", "{NLS('ha', HK)}","ﾊ", 1},
  {"p", "{NLS('o', ZH)}","お ", 2},
  {"q", "{NLS('mugi', KA)}","麦 ", 2},
  {"j", "{NLS('xa', ZK)}","ァ", 2},
  {"f", "{NLS('ne', HK)}","ﾈ", 1},
  {"g", "{NLS('ke', HK)}","ｹ", 1},
  {"b", "{NLS('futokoro', KA)}","懐 ", 2},
  {"v", "{NLS('xe', HK)}","ｪ", 1}
  {"w", "{NLS('ude', KA)}","腕 ", 2},
  {"x", "{NLS('C', ME)}","C", 2},
  {"y", "{NLS('d', ME)}","d", 2},
  {"z", "{NLS('E', ME)}","E", 2}
};
```

METHOD AND APPARATUS FOR UNIVERSAL NATIONAL LANGUAGE SUPPORT PROGRAM TESTING

BACKGROUND OF THE INVENTION

1. Field of the Invention

The present invention relates to apparatus and methods for interoperability testing of computer programs which have been localized for use in foreign countries, and more particularly, for the creation and use of a universal test script in a computer scripting language for efficiently testing software in various national languages.

2. Art Background

Computer programs play an important role in our every day lives. Each year significant investments are made by high technology software companies throughout the world to develop new computer programs. These computer programs are used by a broad spectrum of data processing devices which range from super computers and massively parallel processors, to home video game systems.

Historically, computer programs have been developed in the English language and distributed throughout the world. The distribution of such computer programs includes countries in which English is not a national language. The use of software applications in a country in which English is not the national language requires the "localization" of the software, such that it operates in the local language and utilizes the appropriate character set unique to the language of the particular country. A localized version of the software must not only operate using the local language, but it must also accommodate differences in currency symbols, numbers, and date formats.

Once a software application has been localized for use in a foreign country, the localized software must be tested for functionality and interoperability to verify that the localization process has been successful, and that the program operates without problem in the local language. The process for testing a localized computer program is referred to as "National Language Support" (NLS) testing. In the past, to test localized software a human script writer was required to prepare a test script in a computer scripting language. Currently, there are a variety of computer scripting languages available on the market, including QA Partner Script®, SQL Script® and PERL Script®. In order to test software in different national languages, for example, Japanese, Chinese, Thai or Korean, a script writer is required to develop multiple scripts, one for each one of the languages to be tested. The creation of multiple scripts in the various languages usually requires separate human script writers who are fluent in the particular national language. In addition, separate scripts must be written in the local language for each different computer hardware platform on which the program will be run. Thus, the testing of a localized computer program is time consuming and expensive, since a test script written in Japanese cannot be used to test the same program localized in, for example Chinese, Korean or French. Moreover, a test script written in, for example Japanese, for a personal computer (PC) could not be used to test the same program written for a Unix® system.

As will be described, the present invention provides a method and apparatus utilizing a Universal NLS ("UNLS") paradigm to test software products in various languages directly from a single English language based UNLS script. The present invention permits a single UNLS test script to be utilized for multiple languages, character sets and computer platforms, and thereby provides an efficient and cost effective mechanism for testing localized software.

SUMMARY OF THE INVENTION

A Universal NLS ("UNLS") paradigm is disclosed to test the integration of "localized" multi-national software programs. A user prepares a UNLS test script using a plurality of UNLS operators referred to as "markup symbols". The UNLS operators identify non-ASCII and multibyte characters, as well as provide other functions. The UNLS test script created by the user is provided to a UNLS translator which translates the UNLS test script into any one of a number of desired target languages for a selected target computer platform. The UNLS translator translates the UNLS script by translating ASCII character strings in accordance with the UNLS operators. Each ASCII character in an identified string is translated to a predefined "problem" character in the target language. A maximal coverage look-up table maps ASCII characters to "problem" characters. A problem character is defined as a character in the target language which has historically presented a greater likelihood of error when used by a localized computer program.

The NLS script is then executed by a script interpreter, which may comprise a commercially available interpreter such as, for example, QA Partner®. For instances where the script interpreter cannot accommodate multibyte characters, the UNLS translator translates such multibyte characters into ASCII strings wherein a special flag character is used ("~") to identify multibyte characters in the target language. During execution, the script interpreter operates in conjunction with a UNLS interpreter, such that when a flag "~" is encountered, the UNLS interpreter and script interpreter recognize the identified string as a multibyte character. An input method editor ("IME") is coupled to the UNLS interpreter, and is provided with the ASCII strings representing the multibyte characters by the UNLS interpreter. The IME generates the multibyte character identified by the ASCII string and provides the multibyte character to the application under test. Using the inputs of the NLS test script, the localized software application generates test results which are compared to an answer key in the target language. Errors in the localized application program may be quickly identified, and appropriate fixes made to assure seamless integration of multiple multi-national applications. Accordingly, using the teachings of the present invention, a single UNLS test script is used to create NLS scripts in various national languages and for a plurality of computer platforms and operating environments.

BRIEF DESCRIPTION OF THE DRAWING

FIG. 2 illustrates representative characters from various languages and the corresponding maximum number of bytes required to store the character in a computer memory.

FIG. 4 is one example of a UNLS script listing.

FIG. 5 illustrates an example of the present invention's mapping ASCII characters to "problem" characters in a target language, to obtain maximal coverage testing of the localized software being tested.

FIG. 6 illustrates the present invention's UNLS operators used to create a UNLS script.

FIG. 7 illustrates the present invention's use of the semantic operator for ASCII character strings to provide a literal semantic translation as input characters for testing the localized language.

FIG. 8 illustrates a representative Japanese NLS script generated by the present invention from the UNLS script illustrated in FIG. 4.

FIG. 11(*a*) illustrates one example of the present invention's use of its maximal coverage automated translation system for keystroke or multibyte operators.

FIG. 11(*b*) illustrates examples of Japanese character types identified by a "type" character in the present invention's maximal coverage translation tables.

FIG. 12 illustrates the presently preferred embodiment's maximal coverage translation tables for the Japanese character set.

NOTATION AND NOMENCLATURE

Figure 1:
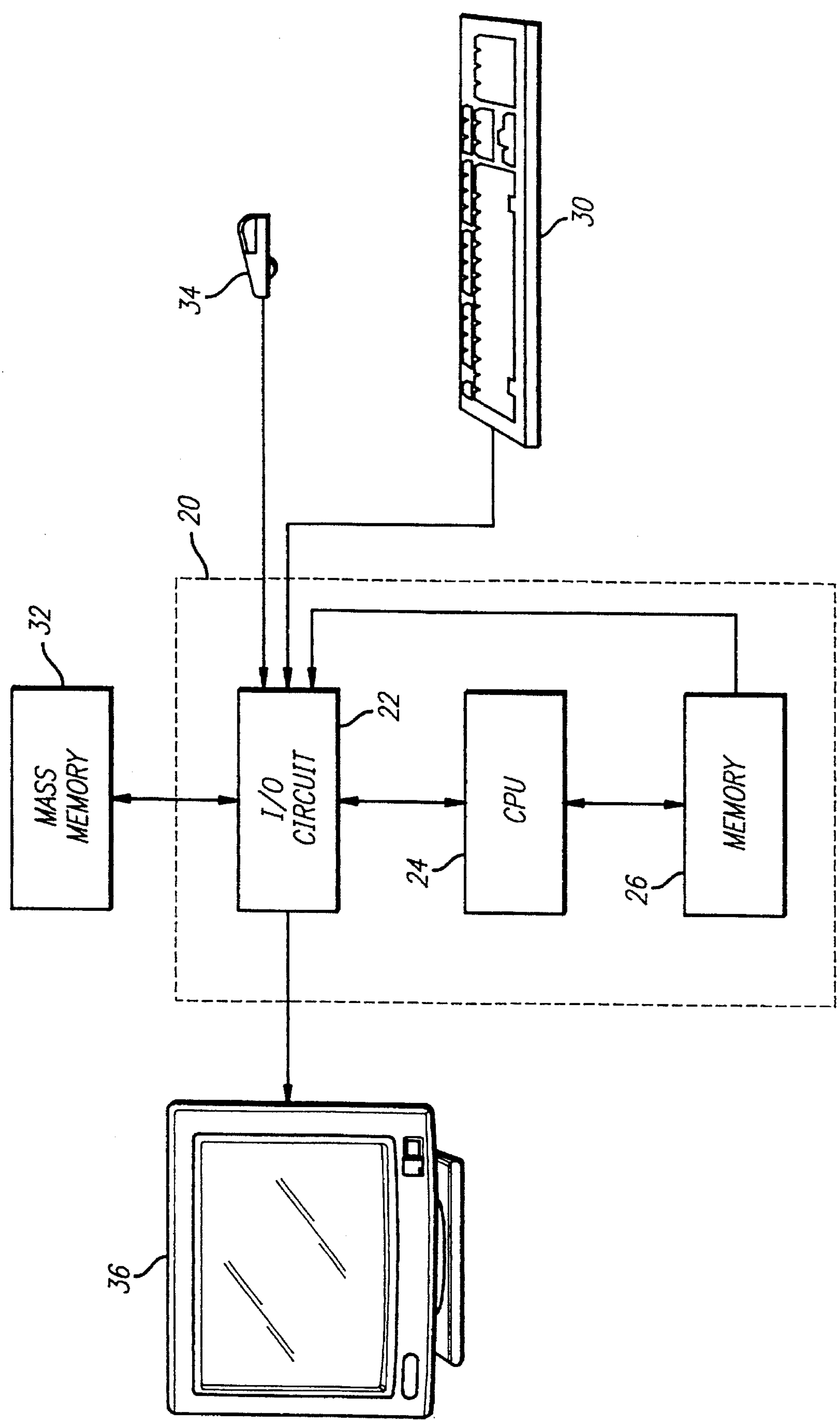
FIG. 1 illustrates a computer system incorporating the teachings of the present invention, and on which, localized software may be tested.

The detailed descriptions which follow are presented largely in terms of symbolic representations of operations of data processing devices coupled to a network. These process descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities may take the form of electrical or magnetic signals capable of being stored, transferred, combined, compared, displayed and otherwise manipulated. It proves convenient at times, principally for reasons of common usage, to refer to these signals as bits, values, elements, symbols, operations, messages, terms, numbers, or the like. It should be borne in mind, however, that all of these similar terms are to be associated with the appropriate physical quantities and are merely convenient labels applied to these quantities.

In the present invention, the operations referred to are machine operations. Useful machines for performing the operations of the present invention include general purpose digital computers or other similar devices. In all cases, the reader is advised to keep in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The method/process steps presented herein are not inherently related to any particular computer or other apparatus. Various general purpose machines may be used with programs in accordance with the teachings herein, or it may prove more convenient to construct specialized apparatus to perform the required method steps. The required structure for a variety of these machines will be apparent from the description given below.

DETAILED DESCRIPTION OF THE INVENTION

In the following description, numerous specific details are set forth such as system configurations, representative scripts and operations, representative languages and character sets, etc., to provide a thorough understanding of the present invention. However, it will be apparent to one skilled in the art that the present invention may be practiced without the specific details. In other instances, well known structures and circuits are not described in detail in order not to obscure the present invention.

Moreover, certain terms such as "knows", "verifies", "stores", "finds", "replaces", "examines", "determines", etc. are used in this Specification and are considered to be terms of art. The use of these terms, which to a casual reader may be considered personifications of computer or electronic systems, refers to the functions of the system as having human like attributes, for simplicity. For example, a reference herein to an electronic system or computer program "determining" something is simply a shorthand method of describing that the electronic system has been programmed or otherwise modified in accordance with the teachings herein. The reader is cautioned not to confuse the functions described with every day human attributes. These functions are machine functions in every sense.

FIG. 1 illustrates a data processing system in accordance with the teachings of the present invention. Shown there is a computer 20 which comprises three major components. The first of these is an input/out (I/O) circuit 22 which is used to communicate information in appropriately structured form to and from other portions of the computer 20. In addition, computer 20 includes a central processing unit (CPU) 24 coupled to the I/O circuit 22 and a memory 26. These elements are those typically found in most general purpose computers, and in fact, computer 20 is intended to be represented of a broad category of data processing devises. Also shown in FIG. 1 is a keyboard 30 to input data and commands into the computer 20, as is well known. A display monitor 36 is shown coupled to the I/O circuit 22 and is used to display images and data generated by the CPU 24 in accordance with the present invention. Any well-known variety of cathode ray tube (CRT) or other type of display may be utilized as display 36.

Referring now to FIG. 2, the representation of character based foreign languages in a computer memory, such as for example memory 26, may require that multiple bytes be used to store each of the characters comprising a character set. Many prior art testing tools are not multibyte compliant and therefore cannot accommodate characters which require more than a single byte of storage in memory 26. Current testing tools are designed to test single byte languages, such as English, and are unable to accommodate certain special characters in multibyte languages. As illustrated in FIG. 2, an English character such as "B" requires a maximum of a single 8-bit byte to store the character in memory 26. Similarly, Asian languages which utilize an alphabet, such as the Thai language, may also be represented by a single byte per character. However, with respect to languages such as Chinese and Japanese which are not strictly alphabet-based, multiple bytes are required to represent each of the characters comprising the entire character set. For example, since there are literally tens of thousands of Chinese characters, a maximum of four bytes are required to represent a single Chinese character. Since Japanese is a combination of Hiragana, Katakana and Kanji characters, the maximum number of bytes required to represent a character in memory 26 is two 8 bit bytes.

As will be described, the present invention transforms multibyte characters into a series of single byte keystroke sequences, and encapsulates the sequences with special characters, such that instead of passing multibyte text into a known testing tool, the present invention encodes the information into a sequence of automated input keystrokes. The sequence may then be provided to any non-multibyte compliant testing tool. The present invention's UNLS interpreter using an input method editor converts the single byte keystroke sequences into multibyte characters. Accordingly, the present invention's approach permits existing single byte compliant testing tools to accommodate multibyte data, and hence test multibyte localized software.

Figure 3:
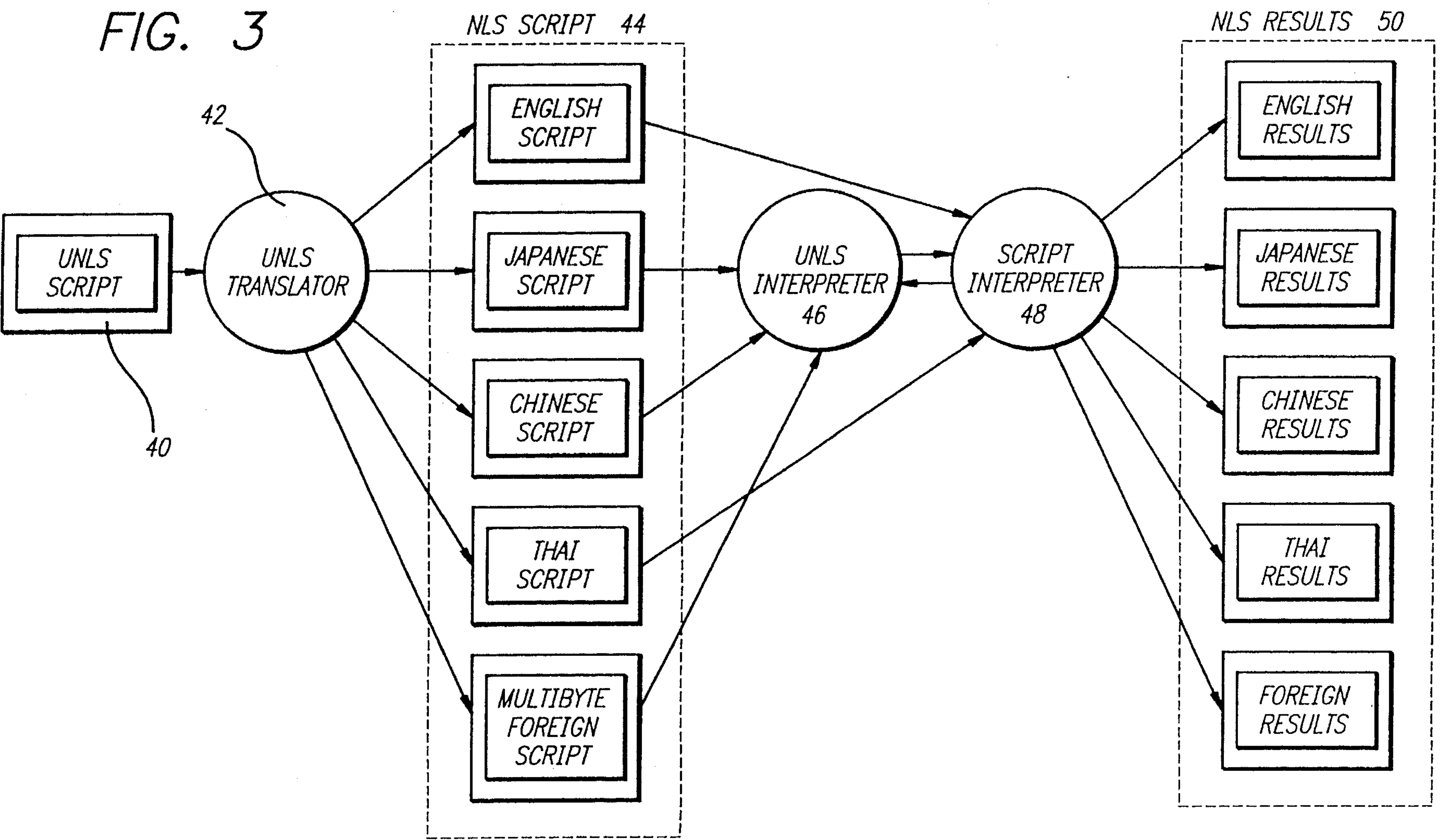
FIG. 3 is a block diagram of the system architecture of the present invention to generate national language NLS scripts utilizing a single UNLS script, and to test localized software to obtain NLS results in the target national language.

Referring now to FIG. 3, the overall architecture of the present invention is illustrated. As shown, a UNLS test script 40 is generated by a user through the use of UNLS operators referred to as "markup symbols" (see FIG. 6). A representative sample of a UNLS test script is illustrated in FIG. 4. As illustrated, in the present example the UNLS script is written using SQL commands in which UNLS operators have been added. The UNLS test script 40 is provided to an UNLS translator 42.

The UNLS translator 42 translates the UNLS test script 40 into one of a desired NLS local language scripts selected by the user. As shown in FIG. 3, a user may select, for example, the Japanese language and corresponding character set to test a software program which has been localized for use in Japan. The UNLS translator 42 utilizes a process referred to as "maximal coverage translation" which, as will be described, maps each ASCII character from the UNLS test script to one of a set of "problem" characters in the target language. The use of maximal coverage translation provides a highly effective test methodology which identifies a set of problematic non-English characters in the target language. For European languages, this set of problematic non-English characters typically comprises a set of special characters and symbols. For multibyte languages, such as Japanese and Chinese, these problematic non-English characters comprise a set of characters whose second bytes are identical to the special characters in the US ASCII range. During the translation process, the ASCII characters from the UNLS script 40 are mapped into the problematic multibyte characters in the target language, on a character-by-character basis. A representative Japanese NLS script provided as an output of the UNLS translator 42 is illustrated in FIG. 8 and corresponds to the UNLS script shown in FIG. 4.

Subsequent to the creation of a NLS script 44 in a selected target language, the testing process provides the NLS script to a UNLS interpreter 46 and a script interpreter 48. The UNLS interpreter 46 is used in cases where the particular language compiler is not multibyte compliant. For example, the SQL*Plus® interpreter currently commercially available is multibyte compliant and the UNLS interpreter 46 would not be required. However, the product referred to as QA Partner® is not multibyte compliant, and would require the use of the UNLS interpreter 46. In FIG. 3, the script interpreter 48 is intended to represent one of the commercially available script interpreters such as SQL*Plus® or QA Partner®, although it is contemplated that various other script interpreters now and in the future commercially available may be utilized. As illustrated in FIG. 3, assuming that a non-multibyte compliant script interpreter, such as QA Partner®, is utilized as the script interpreter 48, those NLS scripts in non-multibyte languages such as Thai and English would be provided directly to the script interpreter 48. For those multibyte languages such as Japanese and Chinese, the scripts must be interpreted by the UNLS interpreter 46 and operate in conjunction with the script interpreter 48, as will be described more fully below. The selected NLS script is executed by the localized computer program using, for example, computer 20, and generates NLS results 50. The NLS results 50 in, for example, Japanese, may then be compared to a test result key (not shown) to determine whether or not errors exist in the localized program.

Referring again to FIG. 4, therein is illustrated one example of a UNLS script 40. As previously described, the UNLS script 40 is a test script which is used to create a script in any of the UNLS supported languages. In creating the UNLS script 40, a user has the option of using eight UNLS operators (referred to as "markup symbols") including "M", "K", "L", "S", "C", "F", "I" or "O" (see FIG. 6). It will be appreciated that although in the presently preferred embodiment eight operators are used, additional UNLS operators may be provided without departing from the spirit and scope of the invention. In addition, it will further be noted that although the UNLS script 40 is shown as being written in SQL with the addition of UNLS operators, other languages may be used as appropriate for any given application.

An example command (referred to by numeral 60) in the UNLS test script 40 shown in FIG. 4 is:

ChartGeni. Uite_textedit1. Typekeys ("select * from ^K:EMP^. . . ");

In the example above, the UNLS operator ^K: is used to translate a non-ASCII character to generate an ASCII sequence consistent with the program QA Partner®, even for multibyte characters as will be described more fully below. The UNLS operator ^M: is used for UNLS scripts which are executed by testing applications that are multibyte compliant. By marking a character string with the ^M: operator, the strings are translated into real strings in the target character set of the selected language. In the presently preferred embodiment, if a the UNLS test script 40 is written for use with for example, SQL* Plus® or Pro*C®, only the UNLS operator ^M: need be used. Moreover, the use of the ^M results in the present invention's employment of maximal coverage translation.

The UNLS operator ^M: results in a one-to-one mapping of an ASCII character to a real target character in the selected language. For example, a UNLS test script 40 command:

Select ^M:Name^from ^M:emp^ results in the present invention, on an ASCII character-by-character basis, substituting a predefined "problem" character for the particular English language ASCII character. As illustrated in the sample table of FIG. 5, when encountering a UNLS operator ^M: and a subsequent ASCII string, the present invention replaces, for example, the ASCII character "a" with a predefined Japanese "problem" character illustrated in FIG. 5. It is important for the reader to appreciate that the corresponding mapping between an English ASCII character and the foreign language (for example Japanese) problem character illustrated in FIG. 5, does not result in a semantic translation in either sound or meaning of the original ASCII character. The maximum coverage automated translation feature of the present invention provides a mechanical, but highly effective, mechanism for uncovering errors in localized programs.

As described above, the present invention's UNLS operator ^M: represents a UNLS operator which does not "translate" English phrases, but rather, replaces ASCII characters with a predefined mapping to problem characters in the target language. A problem character is defined as a character which has, through empirical study, presented problems in the localization of a computer program. As will be discussed, the present invention's semantic operator ^S: does provide the ability for ASCII character strings to be translated in a semantic fashion and used in the NLS script 44.

It has been found, that with proper maximal coverage translation mapping, the present invention's mapping technique utilizing the UNLS operators ^M: and ^K: effectively locate an extremely large percentage of NLS testing errors that are caused by special non-English characters, which may easily have been undetected using previous translation approaches including direct semantic translation. It will be appreciated by one skilled in the art, that for each of the target languages which the present invention supports, such as Japanese, Chinese, Thai, a maximal coverage automated translation table with appropriate mapping is provided. Thus, the creation of an NLS script 44 in for example Japanese, will have a unique set of problem characters to which each of the ASCII characters in the UNLS script are mapped. A similar Chinese or Thai maximal coverage automated translation table must be provided such that those problem characters are identified and mapped to the corresponding ASCII character.

The present invention further permits semantic translation using the UNLS operator ^S:, in which an ASCII character string comprising an English word may be literally translated using a semantic table lookup. Referring to FIG. 7, a representative lookup table is provided between an English word and the corresponding string of Thai characters presenting a literal translation of the ASCII character string. By providing an appropriate semantic operator table lookup resource file disposed in, for example, memory 26 of the computer illustrated in FIG. 1, English words in the UNLS script 40 may be semantically translated into the corresponding Thai word in the NLS script 44. Although FIG. 7 illustrates a semantic translation to Thai, an additional example is illustrated in FIG. 4 wherein the words "bold italic" (see reference numeral 55) are semantically translated into the corresponding Japanese words (reference numeral 58) illustrated in FIG. 8. In general, the use of semantic translation and the semantic operator ^S: is not recommended, since such a semantic translation does not achieve maximal coverage wherein the previously described special set of multibyte problem characters is used to replace the ASCII characters in the target NLS script 44. A direct semantic translation and subsequent execution of the localized program under test, is by its nature, a hit or miss testing approach, and therefore not as reliable as that achieved by using maximal coverage associated translation.

Referring once again to FIG. 6, additional UNLS operators are provided by the present invention including the UNLS operator ^C: which doubles bytes to accommodate UNLS test builder requirements. For example, if the UNLS translator 42 requires, for example, six bytes, and a particular program such as SQL provides only three bytes, the UNLS operator ^C: doubles the bytes to accommodate the requirements of the test builder. The "test builder" is considered herein to comprise the UNLS translator 42 and the UNLS interpreter 46.

The UNLS operator ^F: insures that there are a fixed number of multiple byte operators when the UNLS operator ^M: is used. In other words, utilizing the UNLS operator ^M:, the minimum number of bytes to represent a particular character are utilized. However, there may be occasions where a fixed number of multiple bytes are used to represent all characters in a character set. For example, although the maximum number of bytes required to represent and store a Chinese character in memory 26 is four, there are characters which require less bytes for their representation. Using the UNLS operator ^M:, the minimum number of bytes for the particular character is used. However, by fixing the number of multiple bytes to, for example using the UNLS operator ^F:, all Chinese characters will be represented by four bytes. The UNLS operator ^I: operates in a similar fashion as the operator ^F:, as applied to ASCII keystrokes. The UNLS operator ^O: is a specific implementation for Oracle® database products which provides for a maximum string length for tables, objects and the like.

Turning now briefly to FIGS. 11(*a*) and 11(*b*), assume for the sake of example that a UNLS test script 40 includes a command:

TypeKeys ("select * from ^K:emp^where ^K: hired date^= ^L:01-Dec-94^").

In FIGS. 11(*a*) and 11(*b*), "ZH" corresponds to a Zenkaku Hiragana type of Japanese character, "ZK" corresponds to a Zenkaku Katakana type of Japanese character, "HK" corresponds to a Hankaku Katakana type of Japanese character, and "KA" corresponds to a Kanji type of Japanese character.

As illustrated in FIG. 11(*a*), and as previously described, each of the ASCII characters are mapped using the present invention's maximal coverage automated translation method. The mapping shown in FIG. 11(*a*) is an example of a maximal coverage mapping while FIG. 12 shows the preferred embodiment of the mapping for maximal coverage. In FIG. 11(*a*), there is shown that a UNLS operator ^M: which maps the ASCII character "e" with the corresponding Japanese "problem" character "ソ". The UNLS operator ^K: corresponds to the English typing sequence for generating the multibyte Japanese problem character identified in the maximum coverage automated translation table. In the example illustrated, "so" corresponds to the English character typing sequence, and the letters 'ZK' identify the type of character by class. As illustrated in FIG. 11(*b*), the entire Japanese language character set is represented by a number of distinct classifications. The typing sequence in FIG. 11(*a*) "so" represents the sequence of keystrokes to generate the desired Japanese character using well known commercially available software.

In operation, once the computer 20 is provided with an initial command to indicate that a keystroke sequence will be entered on keyboard 30 to represent a Japanese character, subsequent keystroke entries are received and are mapped into a corresponding table, such that the computer 20 provides the corresponding Japanese character as an output. A subsequent command is provided to the computer 20, to notify the computer 20 that any further keystrokes are to be interpreted in accordance with its normal operating environment (for example, an English keystroke input sequence). Since Japanese characters require at least two bytes for the storage of each character in memory 26, this notification process to the computer 20 is necessary to distinguish English keystrokes from Japanese keystrokes, and to identify the corresponding characters to which they relate. In the example illustrated in FIG. 11(*a*), the input of the typing sequence 'so' results in the generation of the multibyte Japanese character "ソ". As will be described below, the present invention utilizes a commercially available input method editor ("IME") program to detect multibyte characters and provide automated keystroke entry to generate foreign language characters.

As illustrated in FIG. 4, a UNLS script 40 including a command line identified by the numeral 60 is translated by the UNLS translator 42 in accordance with the teachings described herein, and results, in the case of Japanese, in a command line 65 shown in FIG. 8. As illustrated in FIG. 8, the "~" flag identifies multibyte characters. In the present embodiment of the invention, commercial software, such as QA Partner®, is not able to process multibyte characters and therefore, as will be described, the "~" acts as a flag that multibyte characters are required and that the UNLS interpreter 46 must be utilized. The present invention represents multibyte characters as an encapsulated ASCII string corresponding to a sequence of automated input keystrokes. Thus, from the perspective of the script interpreter 48 (e.g., QA Partner®) single ASCII characters are being provided. However, as will be described, ultimately the UNLS interpreter 46 will receive these multibyte characters, and utilize an IME to generate and provide the multibyte characters to the localized computer program which is undergoing testing. It will be noted that although the present embodiment utilizes the "~" character as a flag, that a variety of other characters may be used to encapsulate the ASCII string and achieve functional equivalence in the operation of the present invention.

In the example where an ASCII "e" is encountered for translation, as illustrated in FIG. 11(*a*), the UNLS operator ^M: corresponds to "ソ" which is a multibyte character requiring the typing sequence 'so' which corresponds to a Zenkaku Katakana type of Japanese character. In accordance with the teachings of the present invention, this multibyte Japanese character is represented as a string comprised of single byte ASCII characters as "~Zso~". The representation of the Japanese multibyte character as single ASCII characters renders this format compatible with existing commercial language interpreters such as QA Partner® which are not multibyte compliant.

Figure 9:
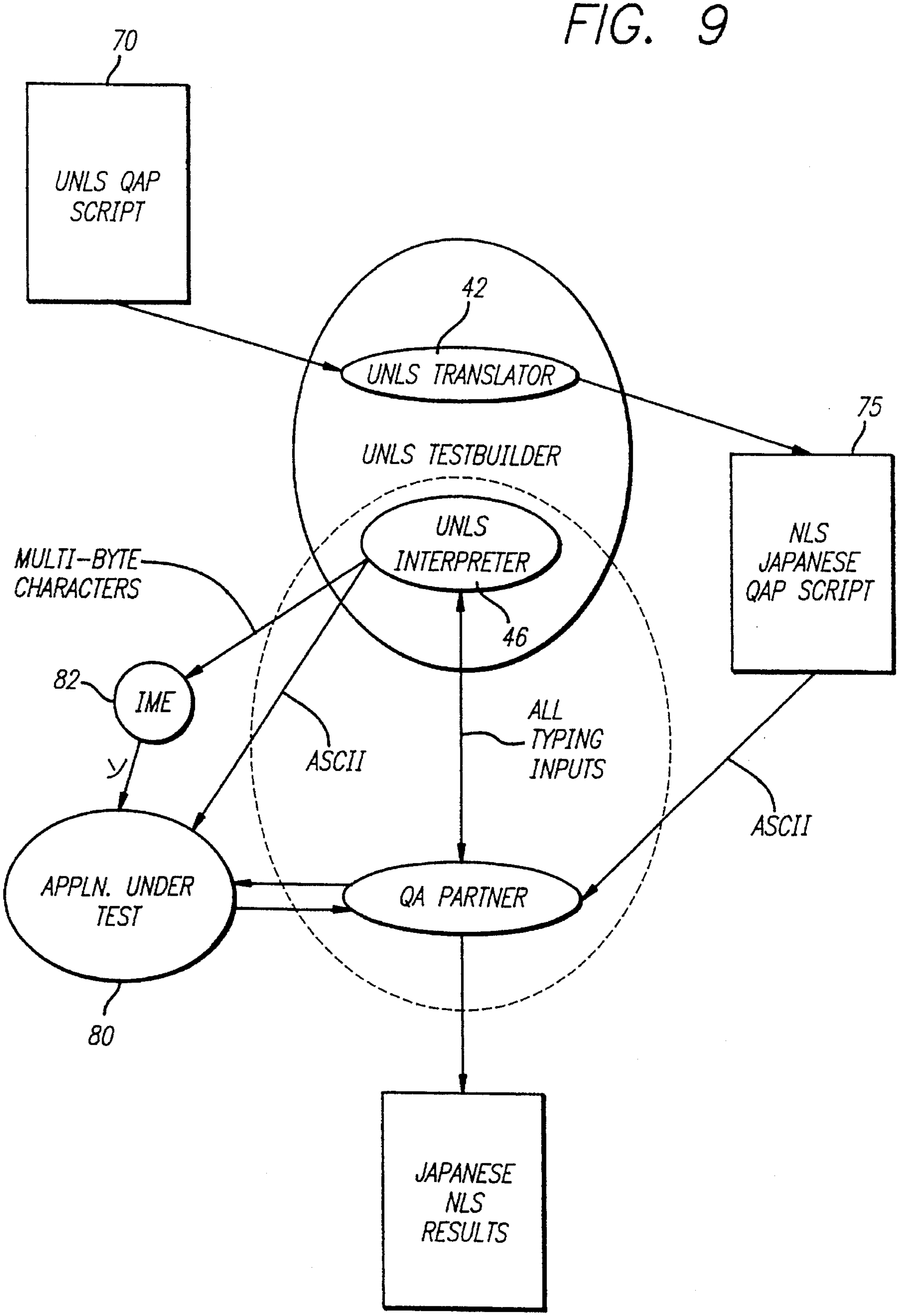
FIG. 9 is a conceptual illustration of the present invention's use of a UNLS script to generate a Japanese language NLS script, and the use of the Japanese language NLS script to test a localized program and obtain Japanese NLS test results.

Referring now to FIG. 9, an example of the operation of the present invention is provided wherein the script interpreter 48 comprises the commercially available software QA Partner®. As previously noted, QA Partner® is not multibyte compliant. As illustrated a UNLS script 70 is written by a user for execution by the script interpreter 48 comprising QA Partner® software. The UNLS script 70 will include UNLS operators such as ^M:, ^K: and the like (FIG. 6). As previously described with respect to the architecture disclosed in FIG. 3, and as shown in FIG. 9, the UNLS script 70 is provided to a UNLS translator 42 to generate a Japanese NLS script 75. In operation, the software programs comprising the UNLS translator 42, UNLS interpreter 46 and script interpreter 48 are executed using the computer 20 shown in FIG. 1.

Since the particular script interpreter 48 (QA Partner®) in the example of FIG. 9, is not multibyte compliant, the Japanese NLS script 75 takes the form of, for example, the Japanese NLS script illustrated in FIG. 8 and includes the "~" flags which identify and encapsulate multibyte characters. From the perspective of the QA Partner® program 80, the Japanese NLS script 75 comprises only single byte ASCII characters. Thus, the Japanese NLS script 75, which has been written for the QA Partner® program 80, provides only ASCII characters despite the fact that Japanese requires multiple bytes to represent the Japanese characters.

As shown in FIG. 9, the Japanese NLS script 75 is provided to the QA Partner® program 80 for execution. As the Japanese NLS script is executed by QA Partner®, in the event that QA Partner® encounters a "~" flag, the complete string of ASCII characters encapsulated by the "~" (for example, "~Zso~") is provided directly to the UNLS interpreter 46. In the present embodiment, all typing inputs are provided from QA Partner® 80 to the UNLS interpreter 46. The UNLS interpreter 46, upon detecting the flag "~" identifies such multibyte character strings and distinguishes them from simple ASCII single byte characters. As shown, all ASCII character strings are provided to the localized computer application under test 80. Multibyte characters encapsulated by the flag "~" are coupled to an input method editor (IME 82) which generates automated input method editor based keystroke sequences and bindings. In the presently preferred embodiment, these bindings are automatically generated and are different for different IME's. In other words, the IME 82 receives the single ASCII character string encapsulated by the flag "~", and includes software as discussed hereinabove to notify the computer 20 that the keystrokes are to be interpreted in accordance with a Japanese language program, such that the typing sequence "so" results in the generation of the Japanese character "ソ". The Japanese character "ソ" is then provided to the application under test 80. In practice, the IME 82 comprises software which is commercially available for automatically inputing a sequence of ASCII characters and generating a corresponding multibyte foreign language character in one of a variety of languages. Examples of commercially available IME's are VJE, produced by Gamma Corporation in Japan, and MSIME, produced by Microsoft Corporation. As previously described, the present invention may be employed with any IME.

The present invention's use of the flag "~" to identify multibyte characters permits commercially available testing tools such as QA Partner® and others which are unable to accommodate multibyte strings, to be utilized in the testing of localized software when used in conjunction with the UNLS interpreter 46. It will further be appreciated by one skilled in the art, that for languages requiring multiple bytes such as Chinese or Japanese, virtually all of the characters will comprise multibyte characters and be coupled to the IME 82 prior to being provided to the application under test 80. In the case of languages such as English which are single byte ASCII characters, the NLS script is effectively executed by the QA partner® (or other equivalent) program and passed through the UNLS interpreter 46 to the application under test 80 for execution.

Figure 10:
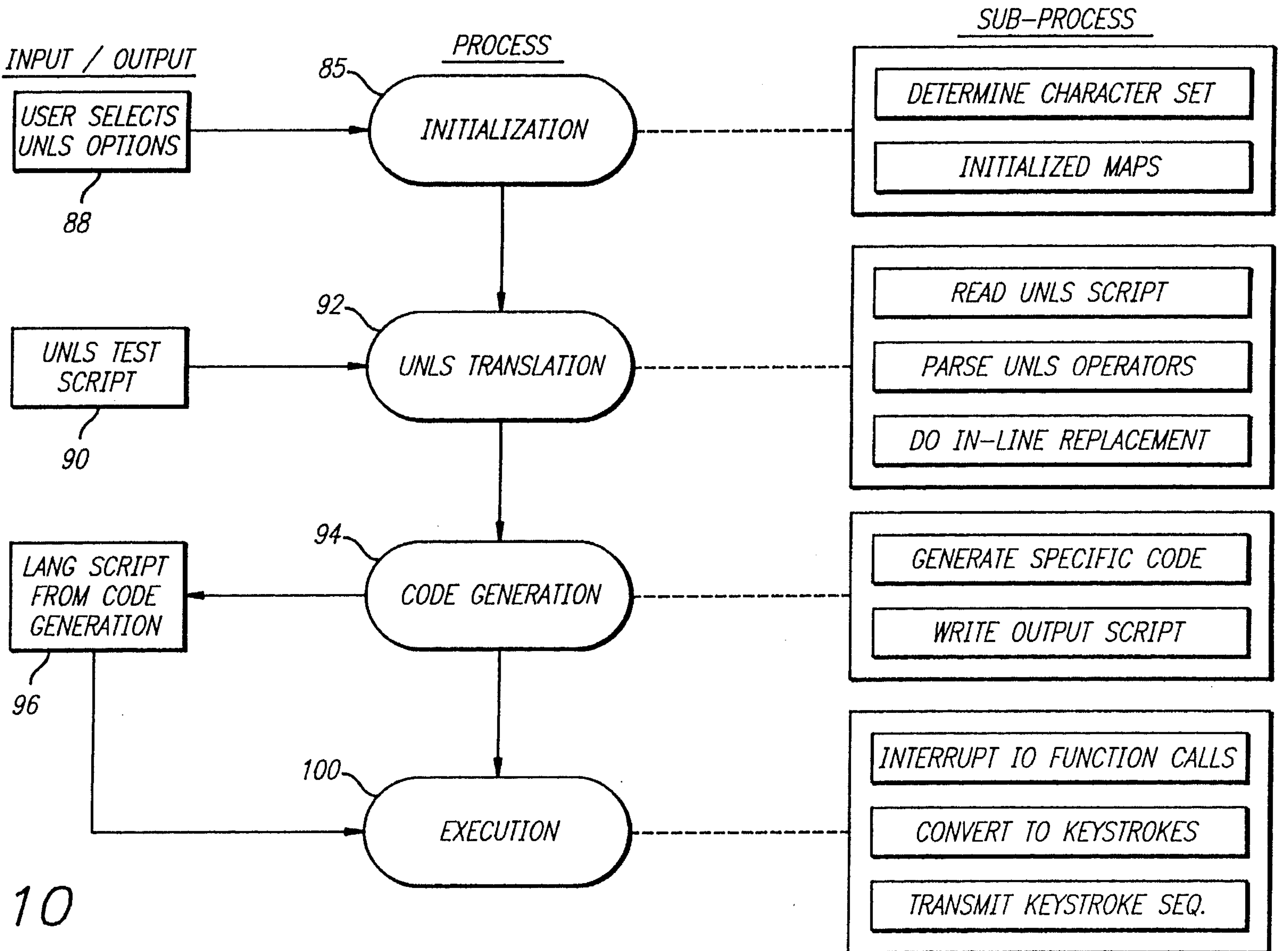
FIG. 10 is a flow chart of the process steps of the present invention.

Referring to FIG. 10, the process of the present invention is illustrated in a flow chart form. As shown, during the initialization phase 85, the user selects UNLS options 88 which include a selection of the appropriate character set (e.g., Japanese, Chinese, Thai, English or the like), and a target computer platform such as the PC or a Unix® system. The user then prepares a UNLS test script 90 and the present invention proceeds through the process of translating the UNLS test script into the target language NLS script. As illustrated in FIG. 10, the output of the UNLS translation step 92 results in the NLS script code generation 94 which comprises the NLS script in the target language 96. The NLS script in the target language 96 is then provided to the computer 20 for execution 100 utilizing a program such as for example, QA Partner®, in conjunction with the UNLS interpreter 46, as previously described.

The present invention has been disclosed which provides apparatus and methods for the efficient and cost effective testing of localized computer software in a foreign language. The present invention eliminates the need for writing NLS test scripts in every language which a computer program must support in various countries, and permits the use of existing language interpreters such as QA Partner®, SQL Scripts®, and the like on multiple computer platforms. Accordingly, the present invention provides apparatus and methods to permit the development of high quality localized software for international markets in a timely and economical fashion. Although the present invention has been described with reference to FIGS. 1–11, it will be appreciated that the figures are for illustration only, and do not limit the spirit or scope of the invention.

We claim:

1. A method for testing a computer program in conjunction with a plurality of NLS systems, said computer program being executed by a computer comprising the steps of:

generating a universal script comprising a desired sequence of test commands;

providing an element for performing the step of translating said universal script into an NLS script in a target language corresponding to one of said plurality of NLS systems;

providing an element for performing the step of providing said NLS script to a script interpreter for interpreting said NLS script and coupling said NLS script including said translated sequence of test commands to said computer for use by said computer program;

providing an element for performing the step of said computer executing said computer program using said translated sequence of test commands and providing test results.

2. The method as defined by claim 1, wherein said step of translating said universal script includes the step of replacing identified ASCII characters in said universal script with predefined characters in said target language.

3. The method as defined by claim 2, wherein said predefined characters represent problem characters in said target language, said predefined characters being selected as having a greater likelihood of detecting errors in said computer program such that said predefined characters provide maximal coverage testing of said computer program.

4. The method as defined by claim 3, wherein a user may select a command such that at least some of said predefined characters in said target language represent a semantic translation of ASCII character strings in said universal script.

5. The method as defined by claim 4, wherein said step of translating said script includes the step of identifying said predefined characters in said target language which are represented using multiple bytes.

6. The method as defined by claim 5, wherein said step of translating said script further includes the step of representing said predefined characters requiring multiple bytes as a string of ASCII characters, the beginning and ending of said string of ASCII characters requiring multiple bytes identified by a flag character.

7. The method as defined by claim 6, wherein each of said string of ASCII characters representing said predefined characters in said target language which are represented using multiple bytes, are encapsulated by said flag character.

8. The method as defined by claim 7, wherein if said script interpreter is unable to accommodate multibyte characters, upon detecting said flag, each of said encapsulated strings of ASCII characters representing said predefined characters represented by multiple bytes is provided to a UNLS interpreter.

9. The method as defined by claim 8, wherein said script interpreter provides said string of ASCII characters requiring multiple bytes to said UNLS interpreter, said UNLS interpreter including input method editor means for generating said predefined characters in said target language from said ASCII characters requiring multiple bytes and providing said generated predefined characters in said target language to said computer program for execution in conjunction with said translated test commands.

10. The method as defined by claim 9, wherein said step of generating a universal script includes the use of universal NLS operators to identify operations selected by said user.

11. The method of claim 1, wherein said step of translating said universal script includes the step of replacing identified sequences of ASCII characters by semantic equivalents in said target language.

12. An apparatus for testing a computer program in conjunction with a plurality of NLS systems, said computer program being executed by a computer, comprising:

a scripting element for generating a universal script comprising a desired sequence of test commands;

a translator for receiving said universal script and translating said universal script into an NLS script in a target language corresponding to one of said plurality of NLS systems;

a script interpreter for receiving said NLS script and interpreting said NLS script and coupling said NLS script including said translated sequence of test commands to said computer for use by said computer program;

said computer executing said computer program using said translated sequence of test commands and providing test results.

13. The apparatus as defined by claim 12, wherein said translator replaces identified ASCII characters in said universal script with predefined characters in said target language.

14. The apparatus as defined by claim 13, wherein said predefined characters represent problem characters in said target language, said predefined characters being selected as having a greater likelihood of detecting errors in said computer program such that said predefined characters provide maximal coverage testing of said computer program.

15. The apparatus as defined by claim 13, wherein a user may select a command such that at least some of said predefined characters in said target language represent a semantic translation of ASCII character strings in said universal script.

16. The apparatus as defined by claim 15, wherein said translator further identifies said predefined characters in said target language which are represented using multiple bytes.

17. The apparatus as defined by claim 16, wherein said translator represents said predefined characters requiring multiple bytes as a string of ASCII characters, the beginning and ending of said string of ASCII characters requiring multiple bytes identified by a flag character.

18. The apparatus as defined by claim 16, wherein each of said string of ASCII characters representing said predefined characters in said target language which are represented using multiple bytes, are encapsulated by said flag character.

19. The method as defined by claim 18, wherein said universal script includes the use of universal NLS operators to identify operations selected by said user.

20. The apparatus as defined by claim 18, wherein said script interpreter provides said string of ASCII characters requiring multiple bytes to said UNLS interpreter, said UNLS interpreter including input method editor means for generating said predefined characters in said target language from said ASCII characters requiring multiple bytes and providing said generated predefined characters in said target language to said computer program for execution in conjunction with said translated test commands.

21. The apparatus of claim 12, wherein said step of translating said universal script includes the step of replacing identified sequences of ASCII characters by semantic equivalents in said target language.

* * * * *